A. SYVERSEN
STOVE PIPE ELBOW.
No. 171,964.  Patented Jan. 11, 1876.
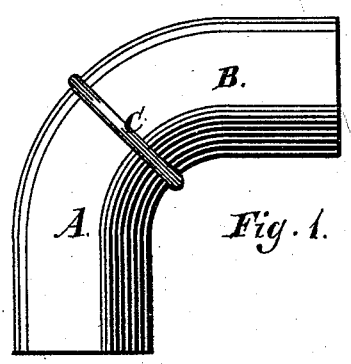
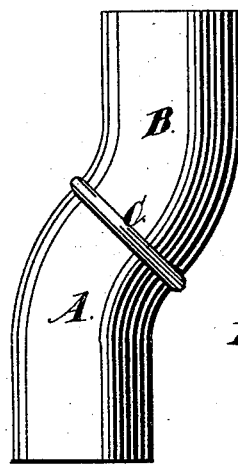
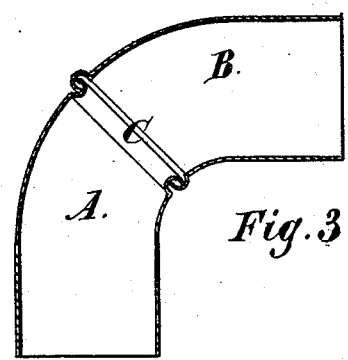
Witnesses:
Heinrich F. Bruns
L. A. Bunting
Inventor:
Andreas Syversen

UNITED STATES PATENT OFFICE.

ANDREAS SYVERSEN, OF CHICAGO, ILLINOIS, ASSIGNOR OF ONE-HALF HIS RIGHT TO JOSEPH S. DENNIS, OF SAME PLACE.

IMPROVEMENT IN STOVE-PIPE ELBOWS.

Specification forming part of Letters Patent No. 171,964, dated January 11, 1876; application filed October 29, 1875.

*To all whom it may concern:*

Be it known that I, ANDREAS SYVERSEN, of Chicago, in the county of Cook and State of Illinois, have invented a Stove-Pipe Elbow, of which the following is a specification, reference being had to the accompanying drawings, which form a part hereof.

The object of my invention is to make a curved elbow jointed in such a manner that one half can be turned upon the other at the joint to change the angle of the elbow.

My invention consists of a curved stove-pipe elbow made with a joint, as hereinafter fully described.

In the accompanying drawings, Figure 1 represents a side elevation of my improved elbow; Fig. 2, a side elevation of the same, with one part of the elbow turned one-half around on the joint; and Fig. 3 represents a central vertical sectional view, showing the construction of the joint.

My stove-pipe elbow is made of two pieces, A and B, of sheet metal formed into a pipe in any known manner. The pipe is curved in the shape shown in the drawing, so that each piece constitutes one-half of the elbow. I form upon the curved end of the piece A of the elbow an external groove, with the edge turning outward, and on the curved end of the piece B are external beads, making an internal groove with the edge turned inward, fitting the edge of one piece into the groove of the other piece, making a joint, C. This joint serves to hold the two pieces of pipe together, while one can turn upon the other to give the angle of the elbow the desired direction. I make my curved pieces of pipe A B smooth, bending them to the curve shown without cutting or crimping them.

I claim—

The curved stove-pipe elbow, consisting of two curved pieces of pipe, A B, connected together by the joint C, and adjustable upon each other, substantially as and for the purpose specified.

ANDREAS SYVERSEN.

Witnesses:
HEINR. F. BRUNS,
L. A. BANTING.